United States Patent

[11] 3,575,162

| [72] | Inventor | Kenneth R. Gaarder |
| | | 6316 Rockhurst Road, Bethesda, Md. |
| | | 20034 |
| [21] | Appl. No. | 785,908 |
| [22] | Filed | Dec. 23, 1968 |
| [45] | Patented | Apr. 20, 1971 |

[54] PHYSIOLOGICAL MONITORS AND METHOD OF USING THE SAME IN TREATMENT OF DISEASE
10 Claims, 3 Drawing Figs.

[52] U.S. Cl. ................................................. 128/2.05T,
128/2.06A
[51] Int. Cl. ................................................. A61b 5/02
[50] Field of Search .......................................... 128/2.05
(T,P,S), 2.06, 2.1, 2 (Cursory); 35/12

[56] References Cited
UNITED STATES PATENTS

| 2,439,495 | 4/1948 | Sturm .................... | 128/2.05 |
| 2,829,637 | 4/1958 | McCormick ............... | 128/2.05 |
| 2,848,992 | 8/1958 | Pigeon ................... | 128/2.05 |
| 3,123,768 | 3/1964 | Burch et al. .............. | 128/2.1UX |
| 3,167,658 | 1/1965 | Richter ................... | 128/2.05X |
| 3,202,149 | 8/1965 | Emmons ................... | 128/2.05 |
| 3,228,391 | 1/1966 | Fitter et al. .............. | 128/2.05 |
| 3,414,896 | 12/1968 | Glick et al. .............. | 128/145.8X |
| 3,433,217 | 3/1969 | Rieke ...................... | 128/2.1X |
| 3,442,263 | 5/1969 | Pascaud ................... | 128/2.05 |

FOREIGN PATENTS

| 1,358,828 | 3/1964 | France ..................... | 128/2.05 |
| 1,080,263 | 12/1958 | Germany .................... | 128/2.06 |

OTHER REFERENCES

Lowther, G.P., et al., Amer. Journ. of Medical Electronics, 1962, July—Sept. pp. 188— 190, (copy in GR 335)

Molyneux, L. et al., British Journ. of Anesth., 1955, 27, pp. 261— 263, (copy in GR 335)

*Primary Examiner*—Richard A. Gaudet
*Assistant Examiner*—Kyle L. Howell
*Attorney*—Cushman, Darby & Cushman

ABSTRACT: Psychotherapeutic treatment of a subject is facilitated by providing the subject with meaningful feedback information derived with the aid of a self-monitoring machine which measures a physiological or psychophysiological variable not ordinarily sensed by the subject. Depending on the nature of the relationship between the variable and the unwanted condition being treated or investigated, the subject learns to gain control over or to account for adverse or unwanted changes in the variable, thereby aiding in the treatment of the unwanted condition or the recognition of the unwanted condition. A specific embodiment of a self-monitor comprises a detector for generating an electrical signal at each heart pulse, a circuit for modifying and compensating the signal to eliminate normal changes in pulse rate and visual signal lights for indicating only significant pulse rate changes to the subject.

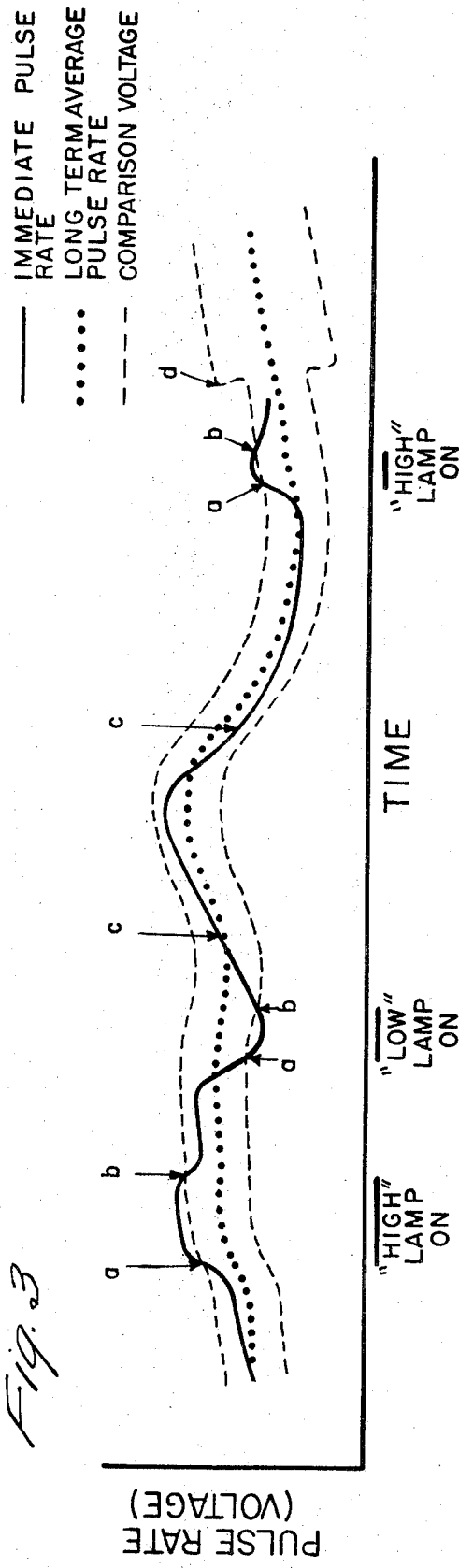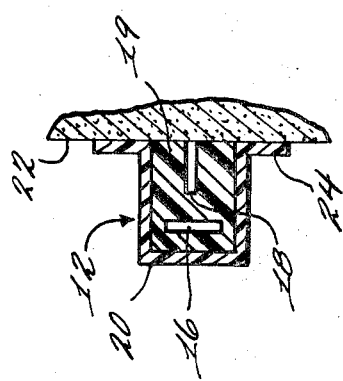

PHYSIOLOGICAL MONITORS AND METHOD OF USING THE SAME IN TREATMENT OF DISEASE

This invention relates to the study of changes in ordinarily unsensed physiological or psychophysiological functions of a human subject and in particular to the continuous monitoring of such a function with moment-to-moment reaction to or study of the function by the subject over subject over a period of time for purposes of developing control over the function or for purposes of analyzing the cause of the change. More specifically, the invention relates to methods and apparatus useful in the treatment of an unwanted physical and/or mental condition by a technique which relies in part on continuously providing the subject during a given period of time with appropriately derived feedback information developed from the concomitant measurement of a physiological or psychophysiological function by means of self-monitoring instrument constructed to provide the information for the purpose at hand.

It has been broadly recognized in the past that a human subject possesses at least some ability to relate his condition of mind and/or body to a change in some easily recognized physiological characteristic in a manner to learn about the condition or to effect an element of control over the condition. A simplified example of this premise is a person, prone to anger, who recognizes a symptom such as a tremor in his hand and consciously suppresses the tremor in order to gain control over his agitated state of mind. A more sophisticated example is the practice of yoga wherein a subject may concentrate on the relationship of a mental or physical discipline, such as the physical discipline of controlled breathing, to his mental state with the object of gaining control over his body.

The present invention in its broad form is a refinement and extension of this concept in that it recognizes that a subject possesses an unexpected capacity to relate changes in an ordinarily automatic, involuntary or unsensed internal physiological function to a state of mind and/or body, provided that the physiological change is presented to him in a meaningful form through the agency of appropriate instrumentation which is capable of measuring the function and deriving a meaningful signal therefrom without adversely affecting the individual's association with his surroundings. Regarding the nature of the internal function which is measured it should be understood that the function may be one which in its entirety is not naturally sensed by the individual. Or the measured function may be one having a particular aspect which is not naturally recognized or which would require inordinate attention by the individual to achieve sensing, thereby adversely affecting or preventing functioning of the individual in other spheres. For example, heart rate is not naturally sensed except with great concentration by the individual, and minor changes in heart rate will escape sensing entirely, yet with proper electronic instrumentation a raw heart rate signal can be simplified and modified and relayed to the individual in the form of a meaningful signal which makes him aware of only those heart rate changes which are significant to the purpose at hand. A self-monitor for effecting a meaningful heart rate signal may include for example, a transducer for generating an initial raw electrical signal, an electronic circuit for cancelling out the effects of normal increases and decreases in heart rate and for activating and deactivating a pair of lamps, one of which becomes lit only when the heart rate decreases from its current mean value and the other of which becomes lit only when the heart rate increases from its current mean value.

Use of the meaningful signal transmitted to the subject may take several forms. The simplest use may be simply teaching the subject to gain control over the measured internal physiological function itself without regard to the cause of the change in the function. Considering again a subject's heart rate, it has been found that a subject can learn to increase or decrease his heart rate with the aid of a self-monitor such as that described briefly above. For this purpose the self-monitor may include additional signals, such as an audio signal responsive to actual immediate heart rate or a tachometer visible to the subject, because in this case the subject needs to concentrate continuously and wholly on the actual signals. By having this information available to him the subject is enabled to try various alterations in his state of mind and body to cause his heart rate to change in the direction desired, and by noting the state of mind or body associated with the changes he will eventually be able to reproduce them later when he wishes to alter his heart rate. The utility of heart rate control by a subject has practical application in current manned space flight, where it has been found that an astronaut's heart rate varies considerably during flight, presumably due to loss of proprioceptive stimuli to the brain caused by changes in acceleration.

A second use of the information feedback technique of the present invention lies in the field of self-observation during psychotherapeutic treatment where it is the cause of the physiological change, i.e. an unwanted state of mind or body of which the subject may be unaware, which is to be concentrated on and analyzed, rather than the physiological change itself. The premise on which this feature of the invention is based is that a subject with a specific liability, be it psychiatric, psychosomatic or functional, will benefit from being able to recognize when the unwanted state is present. That is, by first observing an appropriate signal developed by a suitable self-monitor during a treatment period and soon thereafter retrospectively examining the immediate events, both external and internal, around the time of the change in the measured variable, usually with the aid of a therapist, the subject will be impressed with the importance of the events. This will lead to an understanding of and recognition of the adverse state which caused the change.

Psychotherapeutic treatment of the kind just referred to may be carried out in a variety of modes. For example, using the previously described heart rate monitor during an interview between a therapist and a subject, the latter might relate a sailing experience involving his successful completion of difficult sailing maneuvers and a subsequent mishap due to his inexperience which required the towing of the boat back to the dock. He might observe that his heart rate has increased during the latter part of his narration but at the time he is not aware of any emotional change. In reviewing and discussing the narrated events with the therapist he might conclude that his increased heart rate was the result of a feeling of chagrin at his ineptitude.

A third use of the information feedback technique of the present invention is similar to the self-observation technique but goes further in that the subject learns to exert control over himself so as to correct an unwanted state of mind and/or body which is related to the measured function. That is, rather than merely analyzing the cause of a change in the measured function the subject tries to control the change in the measured function thereby at the same time gaining control over the unmeasured function to which the measured function is related. The measured function must bear some correlation with the unmeasured function, the latter being broadly some unwanted state of mind and/or body of which the subject is not ordinarily aware and the causal relationship between the two functions must first be recognized. For example, it is known that heart rate and degree of muscular relaxation are inversely related.

Therefore, a subject, by noting his heart rate with a suitable monitor, is in a position to judge his relative degree of relaxation and to have an objective standard to apply to himself as he learns to relax his muscle system. The learning process may involve, first, the realization by the subject that by voluntarily tensing his body he can increase his heart rate. Then he can attempt to relax his muscles and judge the degree of his success by noting whether he has effected decrease in heart rate. As control over his heart rate develops he will recognize the feeling of his muscles associated with a decrease in heart rate. In time he will be able to effect the muscle feeling without the use of the monitor; that is he will have learned to control his muscular relaxation (the unmeasured function during the learning period).

A similar teaching mode leading to control of an unmeasured function follows from the known direct relationship between heart rate and blood pressure. That is, after learning to exercise control over his heart rate with the aid of a heart rate monitor a subject may be able to use the control for purposes of controlling his blood pressure, the latter being a function over which it is very difficult for a subject to exercise direct control. During the learning period the control of heart rate is developed by the subject's trying various mental and/or muscular attitudes and noting the effect on heart rate as conveyed to him by the monitor. While this phase is similar in procedure to the previously described relaxation technique, it differs in that the subject has no particular interest in the voluntary activity which effects a change in the measured function.

While changes in heart rate and the significance of the changes have been referred to above in describing some of the broad features of the present invention, it will be understood that signals obtained from many other internal physiological functions may usefully be employed. Thus, persons with specific liabilities, such as anxiety, peptic ulcer or asthma, can learn with the aid of a suitable monitor to recognize recognize the state of mind, body and external circumstances in which the difficulty arises and can learn how to control his response to the measured function by such voluntary functions as insight, avoidance and conditioning. The parameter which is measured by the self-monitor is chosen in accordance with the objective of the treatment, the type of disorder being treated and the relationship between the measured parameter and the disorder, and the parameter may therefore be selected from any of a large number of internal physiological variables. For examples, galvanic skin response, pulse rate and blood pressure are all related to anxiety, gastric acidity is related to peptic ulcer and respiratory variables are related to asthma. The terms liability, disorder, difficulty and unwanted state of mind and/or body are used in this description to designate, broadly, both symptoms and diseases, the latter encompassing psychiatric, psychosomatic and functional diseases.

Referring somewhat more specifically to the self-monitors which are contemplated by the present invention it should again be noted that the initial, raw signal, which is generated from the measurement of the internal physiological variable of the subject usually will not be meaningful or significant to him under the conditions present during treatment. This is particularly true where the treatment involves psychotherapeutic interviews between the subject and a therapist during which there must be no dissociation of the subject's attention from the relationship which has been established between the subject and the therapist. For this reason it is generally necessary to modify the initially generated signal for the purpose of screening out or otherwise compensating for variations which would tend to confuse the subject, as by giving him too much or too little information or giving him distorted information or giving him information which is not really relevant to the purpose of the treatment. For example, where the heart rate is the measured function and a signal indicating a change in rate is the desired final signal which is to be transmitted to the subject, it is necessary to eliminate those slow increases and decreases which occur periodically and spontaneously under normal conditions. Otherwise the subject might be unable to distinguish the normal slow fluctuations from the significant fluctuations resulting from immediate disturbing circumstances, and at least he would have to concentrate on this distinction. This would distract his attention from the relationship between the final output signal of the monitor and the cause of the change in the situation which created the signal. In practice an electronic circuit including various control components is employed.

The invention will be further understood from the following detailed description of an illustrative embodiment taken with the drawing in which:

FIG. 2 is a simplified sectional view of the detector of FIG. 1; and

FIG. 3 is a graphical illustration of the mode of operation of one of the control elements in the circuit of FIG. 1.

Figure 1:
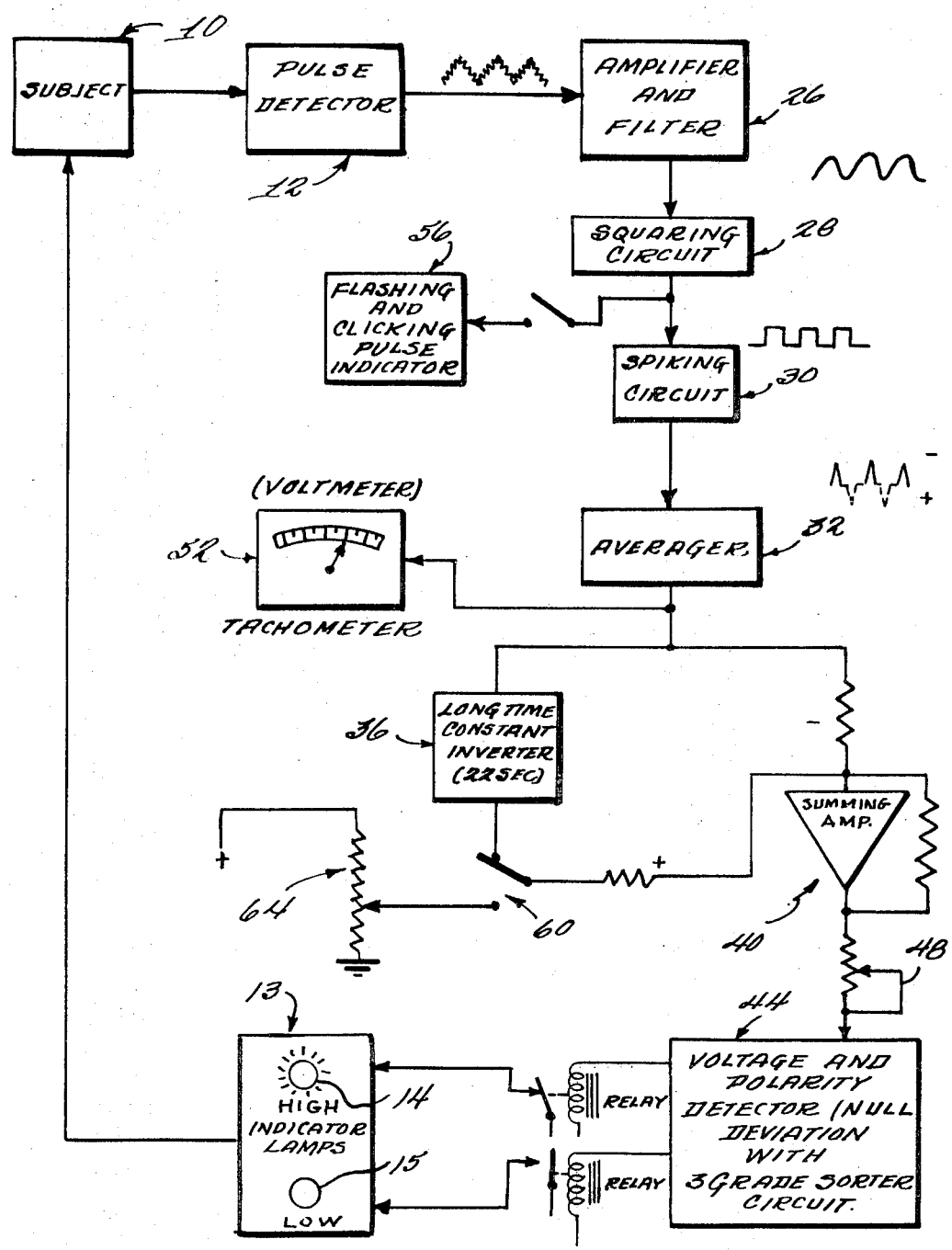
FIG. 1 is a block diagram illustrating an installation for detecting heart rate, deriving an appropriate signal from the measurement and transmitting the signal to a subject.

Referring to FIG. 1, there is shown a system for detecting a physiological variable, in this embodiment the pulse rate, of human subject 10 with a detector 12 and for electrically converting the measured variable into a meaningful signal which in this case is transmitted to the subject 10 from a visual indicator display 13 having a pair of different colored indicator lights 14,15 visible to the subject 10. The circuitry between the detector 12 and the indicator display 13 modifies and simplifies the original electrical output signal from the detector 12 in a manner such that the visual signal which is made available to the subject 10 will be substantially free of variations which would tend to distort the true condition or otherwise confuse the subject 10. More specifically, in the illustrated embodiment, the "high" lamp 14 becomes lit if the immediate heart rate rises above the mean rate (over a preceding period of time) by a predetermined amount and becomes extinguished if the difference between the immediate rate and the mean rate becomes less than the predetermined amount. The "low" lamp 15 functions similarly for a decrease in the immediate rate relative to the mean rate. The result is that a significant change in heart rate will be transmitted to the subject in very simplified from—merely the lighting or extinguishing of one of the lamps 14 or 15—while changes in rate which are not significant will not be transmitted at all. It will be appreciated from the above description that the mean signal for a given preceding time period will change with time. As a result, the final signal to the subject registers a change relative to the subject's own recent performance rather than to an arbitrary standard.

The pulse rate detector 12 may take a variety of forms, one of which is illustrated schematically in FIG. 2. This form has particular utility where it is desireable that the subject not be physically inhibited by the presence of the device. As shown, the detector includes a miniature light source 16 and, as a transducer, a miniature infrared detector element 18 retained in a casing 20 of opaque, lightweight material. The casing 20 is open at one end, and the detector element 18 is disposed adjacent the open end so that it will contact or closely approach the skin 22 of the subject when the open end of the casing 20 is held against the skin 22. The casing 20 is filled with translucent hard plastic 19 to hold the light and the detector. The device operates by virtue of the fact that the intensity of light reflected from the skin 22 varies with each heart pulse due to the minute expansion of the capillaries in the skin 22. These changes are detected by the element 18 and are transmitted as intermittent electric pulses to the remainder of the circuit. A flange 24 may be provided around the opening in the casing to screen out ambient light changes.

The casing 20 of the detector 12 may be removably held in contact with the patient's skin 22 in any suitable way, as by providing a strap (not shown) which encircles the head in the manner of a hatband and holds the device against the forehead. This particular arrangement permits the patient to move his head while conversing with the physician or therapist and permits other normal body movements within the range permitted by the electrical leads (not shown) associated with the detector 12.

Referring now to the circuitry associated with the detector 12, it should be understood that the individual elements employed in the illustrative embodiment may be of conventional construction and therefore require no detailed description. The intermittent electrical pulses from the detector 12 pass first to an amplifier and filter component 26 which amplifies the original signals and filters out extremely fast and extremely slow components of the signals. The output signals at this point are waves generated by the heart pulse, such that the voltage of the signal crosses the zero voltage line twice, once upon contraction of the capillaries and again upon expansion of the capillaries. The approximate shapes of the voltage curves for the signals leaving the detector 12 and the filter 26 are shown in the drawing.

Next in the circuit are a squaring component 28 which converts the sinusoidal heart rate pulse into a square waveform and a spiking component 30, the latter receiving an input signal from the squaring component 28 and putting it through a differentiator having a fast time constant. The resulting output signal is a sequence of voltage spikes having constant polarity and magnitude and a frequency corresponding to the subject's heart rate. The use of electric diodes allows the elimination of the positive pulses, so only one pulse occurs for each heart beat. This signal passes to an averaging component 32 which produces a continuous negative voltage signal proportional to the average number of voltage spikes received per unit of time. The component 32 operates in a known manner by charging a condenser with the incoming voltage spikes and permitting the voltage to drain off continuously at a relatively constant rate. The output of component 32 is a voltage whose magnitude is proportional to the immediate heart rate.

The signal from the averaging component 32 is then converted to a continuous voltage signal which may vary from negative to positive, the polarity and magnitude of the signal indicating the relationship between the immediate heart rate and mean heart rate for a preceding period of time. This function is carried out with a long time constant inverter 36 (an integrator with a long time constant, the basic circuitry of which is shown in Applications Manual for Computing Amplifiers, Philbrick Researches, Inc. 1966, page 46, and which employs an operational amplifier such as Analog Devices, Inc., Model 141A) and a summing amplifier 40. The purposes of the long time constant inverter 36 are to electrically invert, i.e. reverse, the polarity of the output signal of the averager 32 and to further average the signal over a relatively long period of time, for example 22 seconds, by the use of another condenser. The two changes produced in the output of the averager by the inverter 36 are therefore: (1) a reversal of polarity from negative to positive and (2) a smoothing out of the moment-to-moment changes in the voltage.

The summing amplifier 40 combines the voltage taken from the long time constant inverter 36 and the voltage taken directly from the averager 32. Since the summing amplifier 40 adds together a voltage from the averager 32 and the same voltage with its polarity inverted from the inverter 36, the sum of its output might be expected to be zero. However, since there is additional smoothing of the voltage by the inverter's long time constant condenser, the sum of the two voltages added by the summing amplifier reflects immediate changes in the heart rate. For example, if the immediate heart rate, represented by the magnitude of the negative output of the averager 32, is greater than the long term average heart rate, represented by the magnitude of the positive voltage output of the inverter 36, the sum of the two voltages will be a negative voltage. Conversely, if the immediate heart rate were less than the long term average heart rate, the sum of the two voltages will be a positive voltage output from the summing amplifier 40. Therefore, the output from the summing amplifier 40 may be positive or negative or zero depending on the relationship of the immediate heart rate to the long term average heart rate, i.e. depending on whether it is slower, faster or the same as the long term average rate.

The output of the summing amplifier 40 is fed to a voltage and polarity detector 44 having a "null deviation with three-grade sorter" circuit. This component (as well as the preceeding components) is a standard circuit described in manufacturers' applications manuals available for electronic operational amplifier components. Specifically the component 44, which is described in the aforesaid Applications Manual for Computing Amplifiers, at page 91, is capable of differentiating three states of an electric voltage input: whether it is above a certain positive voltage; whether it is below the same negative voltage; or whether it is between these criterion positive and negative voltages. In the cases where the input voltages are above the positive voltage or below the negative voltage, the circuit gives an output voltage at one of two terminals. The output of the detector 44 in turn controls the "high" 14 and "low" 15 indicator lamps by means of electrical relays. By means of an acceptance width control 48, the size of the input voltage relative to the fixed acceptance width of the detector 48 is controlled so as to change the sensitivity of the voltage and polarity detector 44. The voltage and polarity detector 44 therefore causes the "high" or "low" lamp to be lit when the immediate heart rate is above or below the long term heart rate by an amount specified by the acceptance width control 48.

FIG. 3 illustrates graphically and in a simplified way the operation of the circuit components 36, 40 and 44 in controlling the lamps 14 and 15. The solid line is a plot of the immediate heart rate in terms of the magnitude of the voltage of the output signal of the component 32, and the dotted line is a plot of the long term average rate which is the inverted output of the long time constant inverter 36. The dashed lines represent the high and low comparison voltages. These lines are parallel to the curve of the long term average curve, the distance between them being adjusted by manual adjustment of the acceptance width control 48.

The arrows $a$, $b$, $c$ and $d$ indicate the occurrence of significant events which ordinarily will take place during use of the system. The arrows $a$ indicate the occurrence of a change (either an increase or decrease) in the immediate heart rate which is of sufficient magnitude to cause one of the lamps 14 or 15 to light, this occurring when the immediate rate curve differs from the long term average curve by an amount greater than the comparison voltage. The arrows $b$ indicate an opposite change, occurring after a lamp 14 or 15 has been lit, which is of sufficient magnitude to extinguish the lamp. The arrows $c$ indicate a change in immediate rate which is too small to effect lighting of one of the lamps 14 or 15.

The arrow $d$ illustrates the effect of manually adjusting the comparison voltage with the control 48 in a direction to decrease the sensitivity of the system. As seen at the right side of FIG. 3 the comparison voltage curves have moved further apart with the result that any subsequent change in immediate heart rate must be of greater magnitude in order to light one of the lamps 14 or 15. If the control 48 is adjusted in the opposite direction, the comparison voltage lines move closer together with the result that smaller changes in immediate pulse rate will cause one of the lamps 14 or 15 to light.

The type of control effected by the components 36, 40 and 44 is a necessary part of the system in practice, because the human pulse rate slowly fluctuates with time without the cause being relevant to the procedure and because these fluctuations may be more pronounced with some persons than with others. In practice, if a subject has a high amount of spontaneous fluctuation, the manual control component 48 will be set so as to decrease the sensitivity of the system, thereby activating the lamps 14 or 15 only at some fluctuation greater than this amount. In a practical system the scale on the control component 48 may be calibrated in units, say 1 to 10, which represent the heartbeats-per-minute difference between the current heart rate and the long term average heart rate.

Refinements of the system may include a tachometer 52, either instantaneous reading or recording, which conveniently is connected to receive the output signal of the averager 32. There may also be included a device for indicating each heartbeat, such as a flashing and/or clicking indicator 56 connected to receive the output of the squaring circuit 28. The indicator 56 is basically a relay, such as Electric & Relay Co., Type No. 1200, employed to turn a lamp off and on. The instantaneous reading tachometer will be used in learning to control the heart rate by observing the instantaneous rate. The recording tachometer will generally be employed to make a permanent record for future use by the therapist. The flashing and clicking indicator 56 may be employed during a treatment period by either or both the subject and the therapist. Hearing each heart beat has the additional effect upon the subject of putting him in touch with his heart function.

It may also be desirable to use the summing amplifier 40 for certain purposes such as signalling if an astronaut's heart rate is below or above a certain rate, in a manner such that the current pulse rate is compared with a constant voltage signal representing a constant preselected heart rate. In this event the lamp 14 becomes lit by the usual mechanism if the current pulse rate exceeds the standard by, say, four beats per minute, and the lamp 15 becomes lit if the current rate drops below the standard by the same amount. This type of operation is obtained by switching the summing amplifier 40 to manual operation by means of a switch 60 and adjusting the magnitude of the standard voltage to a desired figure with a control component 64.

The illustrated system may be used to advantage in psychotherapy for several reasons. First, the visual signal to the subject is simplified, and the patient need not concentrate on a continuously flashing light or on a recorder. Further, the subject is free to move around while talking and thinking and this is important because he can concentrate on, for example, what he is saying while still being able to see the lamp lamps 14 and 15. In operation of the system during a session the lamps 14 and 15 would, for example, remain unlit while the subject is narrating normally but one of the lamps might light when the patient enters into a distortion, either consciously or unconsciously. The lighted lamps will draw his attention to the fact that some physiopsychological change has occurred. Or, even if he knows that he has undergone a change, the lamp will impress this fact on him. In either case beneficial results are effected during a course of treatments, because the subject learns to recognize what situations are likely to bring on a distortion and learns to exercise control over one or more of his psychological functions in order to resist the occurrence of a distortion. Specific examples of treatment have been described previously.

I claim:

1. A method of treating a subject for a disability comprising continuously measuring a psychophysiological function which fluctuates in response to a characteristic of the disability being treated and generating an electrical signal which varies with changes in the function, electrically processing the signal to obtain a signal which is related to the difference between the instantaneous value of the fluctuating signal and the recent values of the fluctuating signal whereby the effects of slow changes in the variable being measured are eliminated and whereby the last-named signal is indicative of a change relative to the subject's own recent performance, and transmitting the last-named signal to stimulate one of the patient's senses whereby the patient can learn to exercise control over the disability by reacting to said last-named signal.

2. A method as in claim 1 wherein said electrical processing step includes the step of modifying the signal in accordance with the mean value of the psychological function being measured over a preceding short time period.

3. In the psychotherapeutic treatment of a subject the method which comprises: measuring over a period of time the instantaneous value of a physiological function of the subject which varies upon the subject's undergoing a physiopsychological change and converting said measurement into a first electrical signal which varies nearly instantaneously with changes in the function being measured; generating a second electrical signal from said measurement the instantaneous value of which corresponds to the mean value of the function during a preceding short time period; electrically comparing said first and second signals and generating one of two subject-stimulating signals, one of which is responsive only to a predetermined increase of said first signal with respect to said second signal; and the other of which is responsive only to a predetermined decrease of said first signal with respect to said second signal; and exposing the subject to said stimulating signal during said treatment.

4. A method as in claim 3 wherein the physiological function which is measured is the subject's heartbeat and wherein said first and second electrical signals are pulse rate signals.

5. A method as in claim 4 wherein the heartbeat is measured by continuously detecting the intensity of light reflected from a small portion of the subject's skin.

6. Apparatus for use as an aid in treating a subject for a disability during a period when the subject undergoes a change which produces a change in a physiological function, which is not ordinarily sensed by the subject, said apparatus comprising a transducer adapted to be operably associated with the subject and responsive to changes in the physiological function of the subject for producing an electrical signal which varies with said changes; circuit means associated with said transducer for deriving from said signal another signal which is free of normally occurring slow variations not significantly associated with the disability to be treated and which is so simplified as to allow the patient to be able to continue functioning in other concomitant spheres of mental activity; said circuit means includes means for comparing the electrical signal with a signal which is representative of the mean value of the function being measured over a preceding short time period; and transmitter means for transmitting said other signal in a mode to stimulate one of the senses of the subject.

7. Apparatus as in claim 6 wherein said circuit means includes means for generating from said first-mentioned signal a second electrical signal the approximate instantaneous value of which corresponds to the mean value of the physiological function during a preceding long time period, means for comparing said second signal with the nearly instantaneous value of the physiological function as represented by the first-mentioned signal, and means for generating one of two patient-stimulating signals, one of which is responsive only to a predetermined increase of said first signal with respect to said second signal and the other of which is responsive only to a predetermined decrease of said first signal with respect to said second signal.

8. Apparatus as in claim 7 wherein said transducer produces a signal at each heartbeat of the subject and wherein said circuit means derives and compares signals which are proportioned to the short term average heart rate and to a longer term average heart rate.

9. Apparatus for use as an aid in teaching a subject to gain control over a physiological variable which is not ordinarily sensed, said apparatus comprising a transducer adapted to be operably associated with the subject and responsive to changes in the physiological function for producing a raw electrical signal which varies with said changes; electronic circuit means associated with said transducer for deriving from said signal a continuous voltage signal which is proportional to the average value of said raw signal over a predetermined time period; electronic comparing means for comparing said proportional signal with a constant signal and for generating a subject-stimulating signal whenever the difference between the proportion signal with a constant signal and for generation a subject-stimulating signal whenever the difference between the proportion signal and the constant signal is greater than a predetermined amount.

10. Apparatus as in claim 9 wherein said transducer is responsive to the intensity of light reflected from a portion of the subject's skin so as to generate the pulsing raw signal, and wherein said circuit means derives said continuous voltage signal in proportion to the average rate of the pulses over said predetermined time period.